United States Patent Office 2,770,838
Patented Nov. 20, 1956

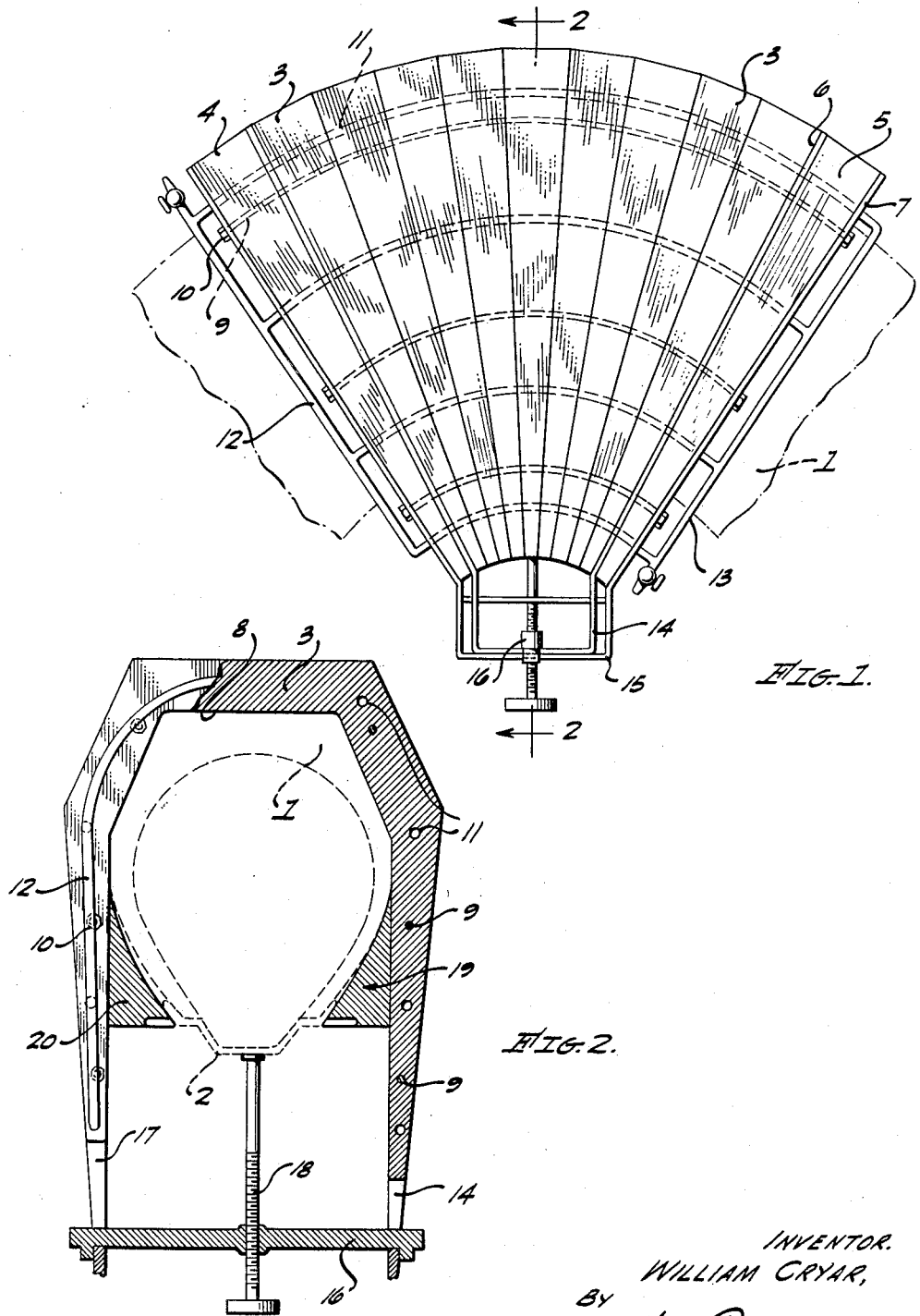

2,770,838

SECTIONAL REPAIR MOLD FOR PNEUMATIC TIRES

William Cryar, Compton, Calif.

Application February 16, 1953, Serial No. 337,055

4 Claims. (Cl. 18—18)

This invention relates to a sectional repair mold for pneumatic tires whereby a part of the tire may be repaired, replaced or refinished whenever a part of the tire has been damaged to a considerable extent by such things as a deep cut, a stone bruise, etc.

An object of my invention is to provide a novel sectional repair mold which can be quickly and easily mounted on the pneumatic tire, and which will be effectively held in position so that the rubber patch forming a portion of the tire will be adequately and effectively cured and shaped to the normal contour of the tire.

An object of my invention is to provide a novel sectional repair mold for pneumatic tires which consists of a plurality of substantially wedge shaped segments, these segments being all held together to form a sectional mold. The wedge shaped segments can be added or taken from the mold to increase or decrease the lengths thereof.

Another object of my invention is to provide a novel means of heating the repair mold so that the rubber patch or section on the tire will be effectively and adequately cured.

Still another object of my invention is to provide a novel means of effectively pressing the sectional mold around the tire so that the patched area will conform in shape to the normal contour of the tire.

A feature of my invention resides in the means whereby the clamp bar is attached to the mold so that the clamp screw may properly engage the rim of the pneumatic tire.

Other objects, advantages and features of invention may appear from the accompanying drawing, the subjoined detailed description and the appended claims.

In the drawing:

Figure 1 is a side elevation of my sectional repair mold.

Figure 2 is a sectional view taken on line 2—2 of Figure 1.

Referring more particularly to the drawing, the usual pneumatic tire 1 is provided with the metal rim 2 and upon which the tire is mounted, all of this is usual and well known in the art. The tire 1 also includes an inner tube so that this tire may be properly inflated. In practicing my invention the pneumatic tire is inflated, thus providing the required outward pressure on the carcass of the tire to press the rubber, forming the patch against the inside of the mold, as will be further described.

My sectional mold is arcuate in shape and extends over only a portion of the pneumatic tire 1. In other words, it is a patch type of mold and is not intended to place the entire tread on the tire. My sectional mold consists of a plurality of segments 3, each of which are substantially wedge shaped, that is, they taper towards the inside of the tire. The wedges 3 are all substantially identical in shape so that any of them can be removed or replaced so as to provide a narrower or wider mold, as may be necessary. The segments 3 are preferably cast and may be made of cast aluminum.

The outermost segments 4 and 5 of the mold are positioned between an inner frame plate 6 and an outer frame plate 7. These frame plates are preferably made of steel and the shape of the inner contour of these frame plates is substantially identical to that of the segments 3, 4 and 5. The inner surface or contour of the segments 3, 4 and 5, as shown at 8, is that of the outer shape of the pneumatic tire 1, in other words, it is the shape of the cross-section of the tread of the tire. Thus when the sectional mold is in position on the tire, it will accurately conform to the outer contour of that tire and will properly mold the rubber patch or section. The segments 3, 4 and 5 are all held in proper position relative to each other by means of a plurality of rods 9 which extend through the various segments and nuts 10 on the ends of these rods enabling the segments to be drawn tightly together so that no substantial cracks will appear between the segments. A plurality of steam pipes 11 extend through the segments 3, 4 and 5 and these pipes extend from the intake manifold 12 on the one side to the exhaust manifold on the other. Thus, when steam is circulated through the heating pipes 11, segments 3, 4 and 5 will all be heated, thus properly curing the rubber which forms this section of the tire.

To hold the sectional repair mold tightly pressed against the periphery of the tire, I provide the following structure:

The plates 6 and 7 are formed with stirrups 14 and 15 at their lower ends. A bar 16 extends transversely across the tire and from one stirrup 14 to its corresponding one on the other side 17. A clamping screw 18 threads through the bar 16 and bears against the bottom of the rim 2. When the screw 18 bears against the rim 2 it will press the bar 16 downwardly, thus drawing the segments 3, 4 and 5 all downwardly against the periphery of the tire 1. Thus the repair section of the tire is securely pressed in position and, since the tire is partly or entirely inflated, the outer contour of the repaired section will conform accurately to the normal contour of the tire. Steam is now introduced and passes through the manifolds 12—13 and through the pipes 11, thus curing the rubber in the repair section. To reinforce the lower portions of the tire 1 adjacent to the rim 2, I provide two arcuate wedge blocks 19 and 20 which fit one on each side the tire as shown in Figure 2, and prevent the part of the tire thus engaged from bulging outwardly due to the downward pressure of the sectional mold.

Having described my invention, I claim:

1. A sectional repair mold for pneumatic tires comprising a plurality of substantially wedge shaped segments arranged in juxtaposition and abutting one another, a pair of frame plates arranged one on each side of the outermost segments of the mold, a stirrup on the lower end of said plates, clamp means engaging the stirrups and bearing against the pneumatic tire to hold the mold on the tire, means holding said segments in assembled position, and conduit means extending through all of said segments to heat the same, said conduit means extending from one side of the mold to the other.

2. A sectional repair mold for pneumatic tires comprising a plurality of substantially wedge shaped segments arranged in juxtaposition and abutting one another, a pair of frame plates arranged one on each side of the outermost segments of the mold, a stirrup on the lower end of said plates, clamp means engaging the stirrups and bearing against the pneumatic tire to hold the mold on the tire, a plurality of rods extending through the segments to hold the same in assembled position, and a plurality of conduits extending through all of the segments to heat the same, said conduit means extending from one side of the mold to the other.

3. A sectional repair mold for pneumatic tires comprising a plurality of substantially wedge shaped segments arranged in juxtaposition and abutting one another, a pair of frame plates arranged one on each side of the outermost segments of the mold, a stirrup on the lower end of each of said plates, a bar resting on said stirrups, a clamp screw threaded through the bar and bearing against the pneumatic tire to hold the mold on the tire, means extending through and holding said segments in assembled position, and conduit means extending through all of said segments to heat the same, said conduit means extending from one side of the mold to the other.

4. A sectional repair mold for pneumatic tires comprising a plurality of substantially wedge shaped segments arranged in juxtaposition and abutting one another, a pair of frame plates arranged one on each side of the outermost segments of the mold, a stirrup on the lower end of each of said plates, a bar resting on said stirrups, a clamp screw threaded through the bar and bearing against the pneumatic tire to hold the mold on the tire, means extending through and holding said segments in assembled position, and conduit means extending through all of said segments to heat the same said conduit means extending from one side of the mold to the other, and wedge blocks positioned within the assembled mold and bearing against the tire adjacent the inner edge of the tire.

References Cited in the file of this patent

UNITED STATES PATENTS

| 1,721,094 | Sease | July 16, 1929 |
| 1,905,463 | Grange | Apr. 25, 1933 |
| 1,923,736 | Lewis et al. | Aug. 22, 1933 |
| 2,438,677 | Ostler | Mar. 30, 1948 |
| 2,440,321 | Bacon, Jr. | Apr. 27, 1948 |

FOREIGN PATENTS

| 174,539 | Great Britain | Feb. 2, 1922 |
| 354,612 | Germany | June 12, 1922 |